United States Patent [19]

Wetzstein et al.

[11] Patent Number: 6,046,045
[45] Date of Patent: Apr. 4, 2000

[54] METHODS FOR DECOMPOSING QUINOLONES AND NAPHTHYRIDONES

[75] Inventors: Heinz-Georg Wetzstein, Leverkusen; Hans-Georg Rast, Bergisch Gladbach; Wolfgang Karl, Odenthal; Rainer Martens, Braunschweig; Frantisek Zadrazil, Hillersee, all of Germany

[73] Assignee: Bayer Aktiengesellschaft, Leverkusen, Germany

[21] Appl. No.: 09/051,819

[22] PCT Filed: Oct. 11, 1996

[86] PCT No.: PCT/EP96/04421

§ 371 Date: Apr. 17, 1998

§ 102(e) Date: Apr. 17, 1998

[87] PCT Pub. No.: WO97/15354

PCT Pub. Date: May 1, 1997

[30] Foreign Application Priority Data

Oct. 24, 1995 [DE] Germany .............................. 195 39 445
Apr. 30, 1996 [DE] Germany .............................. 196 17 283

[51] Int. Cl.[7] .................................................... C12S 13/00

[52] U.S. Cl. .................. 435/262; 435/262.5; 210/601
[58] Field of Search .................................. 435/262, 262.5; 210/601

[56] References Cited

U.S. PATENT DOCUMENTS 5,143,828   9/1992   Atlas et al. .

FOREIGN PATENT DOCUMENTS 0 192 237   8/1986   European Pat. Off. .
41 04 624   1/1993   Germany .
43 14 352   11/1994  Germany .

*Primary Examiner*—William H. Beisner
*Attorney, Agent, or Firm*—Joseph C. Gil; Godfried R. Akorli

[57] ABSTRACT

The present invention relates to two processes for the treatment of antimicrobially, in particular antibacterially, acting quinolone- and naphthyridonecarboxylic acids and derivatives thereof with wood rot fungi, if appropriate in the presence of water and/or inert solid or liquid substrates and further auxiliaries.

7 Claims, No Drawings

METHODS FOR DECOMPOSING QUINOLONES AND NAPHTHYRIDONES

The present invention relates to two processes for the degradation of antimicrobially, in particular antibacterially, acting quinolone- and naphthyridonecarboxylic acids and derivatives thereof with the aid of wood rot fungi.

Antimicrobially acting substances are widely used in medicine and veterinary medicine. The preparation of these active compounds is accompanied by problems in the elimination of production residues, wastewaters and packaging containing the active compound. Wastewaters containing active compound from high-volume users, such as hospitals, animal breeders and animal fatteners, also present problems. Further problems may arise with the decontamination of waters or soils if active compound is undesirably released in the event of accidents.

In such cases, the antimicrobial activity of the active compounds can prevent the customary degradation by bacteria in soils, waters and sewage treatment plants. Under certain circumstances, an undesirable interference, for example in biologically operating sewage treatment plants, may even occur if relatively large quantities of wastewaters containing active compound have to be processed, i.e. in all these cases an expensive pretreatment of the wastewaters, residues and the like is necessary.

A simple treatment with which the active compounds can be degraded to the extent that they lose their antibiotic activity and their further degradation can take place by the customary biological degradation methods should be found for these cases.

Processes for the degradation of organic harmful substances with the aid of lignin-degrading fungi were known from a) German Offenlegungsschrift 4 104 624 and b) EP 0 192 237 A1.

However, the degradation in a) is demonstrated only on the example of aromatic hydrocarbons. According to German Offenlegungsschrift 4 104 624, halogen-containing hydrocarbons cannot be degraded in this manner.

EP 0 192 237 A1 mentions some examples of chlorinated hydrocarbons which can be degraded by the white rot fungus *Phanerochaete chrysosporium*.

It was not to be expected that the fluorine-containing heteroaromatic quinolones and naphthyridones are attacked by white rot fungi and, in particular, brown rot fungi or even wood-degrading Ascomycetes. In contrast there is the conviction, expressed publicly many times, that there are no microorganisms which can degrade such compounds (cf., for example, in the Swedish Journal "Land" June 1995, page 4). There is no indication in the scientific literature of a significant degradation of such compounds by microorganisms. Likewise, brown rot fungi generally are attributed only very limited capabilities in the cleavage of aromatic rings with furthermore significantly lower capacities (compared with white rot fungi; J. Buswell, 1991). In the abstracts of the "Division of Agrochemicals of the American Chemical Society 1993 issue No. 44", the extremely low bioavailability of $^{14}$C-labeled sarafloxacin in soil samples is reported in one abstract (No. 92). It was found that sarafloxacin was not notably degraded by microorganisms in the soil.

The present invention relates to:

1. A process for the treatment of antimicrobially, in particular antibacterially, acting quinolone- and naphthyridonecarboxylic acids and derivatives thereof with wood rot fungi, in particular white rot or brown rot fungi, if appropriate in the presence of water and/or inert solid or liquid substrates and further auxiliaries.

2. A process for the degradation of antibacterially and antimicrobially acting quinolone- and naphthyridonecarboxylic acids and derivatives thereof, characterized in that the active compounds are treated with wood rot fungi, in particular white or brown rot fungi, if appropriate in the presence of water and/or inert solid or liquid substances and further auxiliaries.

3. A process for the treatment of wastewaters which comprise antibacterially and antimicrobially acting quinolone- and naphthyridonecarboxylic acids and derivatives thereof with wood rot fungi, in particular white or brown rot fungi.

4. A process for the treatment of manure from intensive animal husbandry, which comprises antibacterially and antimicrobially acting quinolone- and naphthyridonecarboxylic acids and derivatives thereof with wood rot fungi, in particular white or brown rot fungi.

5. A process for the treatment of soils which comprise antibacterially and antimicrobially acting quinolone- and naphthyridonecarboxylic acids and derivatives thereof with wood rot fungi, in particular white or brown rot fungi.

The best known wood-destroying Basidiomycetes are divided into 2 large groups: on the one hand into the lignin-degrading white rot fungi, and on the other hand into the cellulose- and hemicellulose-degrading brown rot fungi, which essentially do not degrade lignin but merely modify it by hydroxylation and demethylations. White rot fungi are distinguished by extracellular enzymes, such as lignin peroxidases, manganese peroxidases and laccases, which as a rule are missing from brown rot fungi. The two groups can be distinguished by chemical detection methods (cf., for example, Stalpers, 1978, Studies in Mycology, No. 16, Centralbureau voor Schimmelcultures, Baarn, Holland). In the case of brown rot fungi, the hydroxyl radical is of decisive importance for the degradation activity. The wide differences between white and brown rot fungi, in particular in respect of the molecular mechanisms of the degradation of wood, are documented in the technical literature (cf., for example, Evans et al., FEMS Microbiological Reviews 13 (1994) 235–240).

Examples which may be mentioned of genera of wood rot fungi which can be employed in the processes according to the invention are:

White rot fungi:
Bjerkandera sp.
Cladoderris sp.
Coriolopsis sp.
Coriolus sp.
Ganoderma sp.
Irpex sp.
Phanerochaete sp.
Phellinus sp.
Phlebia sp.
Pleurotus sp.
Trametes sp.
Trichaptum sp.
 Brown rot fungi:
Fomitopsis sp.
Gloeophyllum sp.
Leatiporus sp.
Pholiota sp.
Serpula sp.
 Litter degraders:
Agrocybe sp.
Hypholoma sp.
Stropharia sp.

Others:
Xylaria sp. (Ascomycet)
The following species may be mentioned as preferred examples:
White rot fungi:
*Bjerkandera adusta* DSM 4708
*Cladoderris dendritica* DSM 9611
*Coriolopsis rigida* DSM 9596
*Coriolus* sp.
*Ganoderma lucidum* DSM 9621
*Irpex lacteus* DSM 9595
*Phanerochaete chrysosporium* DSM 9620
*Phanerochaete chrysosporium* DSM 1556
*Phanerochaete chrysosporium* ATCC 24725
*Phellinus gilvus* DSM 9602
*Phlebia radiata* DSM 5111
*Pleurotus* sp. DSM 9618
*Trametes versicolor* DSM 3086
*Trametes villosa* DSM 9589
*Trichaptum bysogenum* DSN 9597
Brown rot fungi:
*Fomitopsis spraguei* DSM 9600
*Gloeophyllum sepiarium* DSM 6420
*Gloeophyllum striatum* DSM 9594
*Gloeophyllum striatum* DSM 9592
*Gloeophyllum striatum* DSM 10335
*Gloeophyllum trabeum* DSM 3087
*Leatiporus sulphureus* DSM 2785
*Pholiota aurivella* DSM 5070
*Serpula lacrymans* DSM 8728
Litter degraders:
*Agrocybe* sp.
*Hypholoma* sp.
*Stropharia rugosoannulata* DSM 9616
*Stropharia* sp.
Others:
*Xylaria digitata* DSM 914 (Ascomycete)
Those which may be mentioned as especially preferred are:
White rot fungi:
*Irpex lacteus* DSM 9595
*Phanerochaete chrysosporium* DSM 1556
*Phanerochaete chrysosporium* DSM 9620
Brown rot fungi:
*Gloeophyllum striatum* DSM 9592
*Gloeophyllum striatum* DSM 9594
*Gloeophyllum striatum* DSM 10335
Litter degraders:
*Stropharia rugosoannulata* DSM 9616

Wood rot fungi are known. The abovementioned species of wood rot fungi are included in public collections of microorganisms and are freely accessible; for example, those marked DSM are accessible from the Deutsche Sammlung für Mikroorganismen [German Collection of Microorganisms] (DSMZ), Mascheroder Weg 1b, 38116 Braunschweig.

It is readily possible to replace one of the species mentioned by another from the same group.

Antibacterially and antimicrobially acting quinolone- and naphthyridonecarboxylic acids which may be mentioned are the compounds of the following formulae (I) and (II)

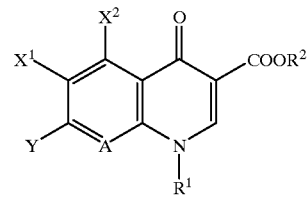

(I)

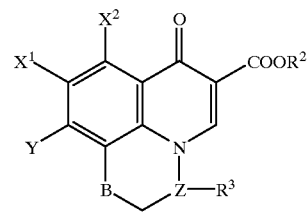

(II)

in which
$X^1$ and $X^2$ independently of one another represent hydrogen, halogen, $C_{1-4}$-alkyl, $C_{1-4}$-alkoxy or $NH_2$,
Y represents radicals of the structures

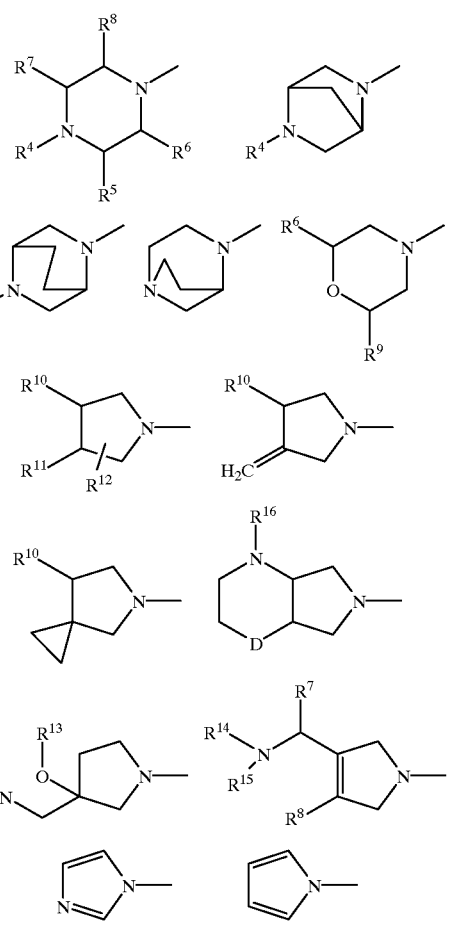

wherein
$R^{16}$=H, —$CH_3$, —CH=CH—$CO_2R^{16'}$, —$CH_2$—$CH_2$—$CO_2R^{16'}$, —$CH_2$—CO—$CH_3$, —$CH_2$—$CH_2$—CN,
$R^{16'}$—Me or Et,
D=O or —$CH_2$—, $R^4$ represents hydrogen, optionally hydroxyl- or methoxy-substituted straight-chain or branched $C_1$–$C_4$-alkyl, cyclo-propyl or acyl having 1 to 3 C atoms, $R^5$ represents hydrogen, methyl, phenyl, thienyl or pyridyl, $R^6$ represents hydrogen or $C_{1-4}$-alkyl, $R^7$ represents hydrogen or $C_{1-4}$-alkyl, $R^8$ represents hydrogen or $C_{1-4}$-alkyl, $R^9$ represents hydrogen, methyl or —$CH_2$—$NR^7R^8$, $R^{10}$ represents hydrogen, $C_{1-4}$-alkyl, amino, optionally hydroxyl-substituted alkyl- or dialkylamino having 1 or 2 C atoms in the alkyl part, amino-$C_{1-4}$-alkyl, $C_{1-4}$-alkylamino-$C_{1-4}$-alkyl or 1-imidazolyl, $R^{11}$ represents hydrogen, hydroxyl, methoxy, methylthio, halogen, methyl or hydroxymethyl, $R^{12}$ represents hydrogen or methyl, $R^{13}$ represents hydrogen or $C_{1-4}$-alkyl, $R^{14}$ represents hydrogen or $C^{1-4}$-alkyl and $R^{15}$ represents hydrogen or $C^{1-4}$-alkyl, $R^1$ represents hydrogen, an optionally halogen-substituted alkyl residue having 1 to 3 carbon atoms, cyclopropyl, methoxy, 4-fluorophenyl, 2,4-difluorophenyl or methylamino, $R^2$ represents hydrogen or optionally methoxy- or 2-methoxyethoxy-substituted alkyl having 1 to 6 carbon atoms, as well as cyclohexyl, benzyl, 2-oxopropyl, phenacyl, ethoxycarbonylmethyl or pivaloyloxymethyl, $R^3$ represents hydrogen, methyl or ethyl and $X^1$ and Y, together with the adjacent C atoms, represent a dioxolanyl residue or dioxoamyl residue, A represents nitrogen or =CH—, =C(halogen)—, =C(OCH$_3$)—, =C(CH$_3$)— or =C(CN)—, B represents oxygen, optionally methyl- or phenyl-substituted =N— as well as =CH$_2$, Z represents =CH— or =N—, and their pharmaceutically usable hydrates, acid addition salts and salts with bases. The compounds of the formulae I and II can be present in the form of their racemates or in enantiomeric forms.

Preferred compounds of the formulae (I) and (II) are those in which $R^1$ represents optionally fluorine-substituted $C_1$–$C_3$-alkyl, or represents cyclo-propyl, $R^1$ represents an alkyl residue having 1 to 3 carbon atoms, cyclopropyl, 2-fluoroethyl, methoxy, 4-fluorophenyl, 2,4-difluorophenyl or methylamino, $R^2$ represents hydrogen or optionally methoxy- or 2-methoxyethoxy- substituted alkyl having 1 to 6 carbon atoms as well as cyclohexyl, benzyl, 2-oxopropyl, phenacyl, ethoxycarbonylmethyl or pivaloyloxymethyl, $R^3$ represents hydrogen, methyl or ethyl and A represents nitrogen or =CH—, =C(halogen)—, =C(OCH$_3$)—, =C(CH$_3$)— or =C(CN)—, B represents oxygen, optionally methyl- or phenyl-substituted =N— as well as =CH$_2$ and Z represents =CH— or =N—, $X^1$ and $X^2$ independently of one another represent hydrogen, halogen or NH$_2$, Y represents radicals of the structures

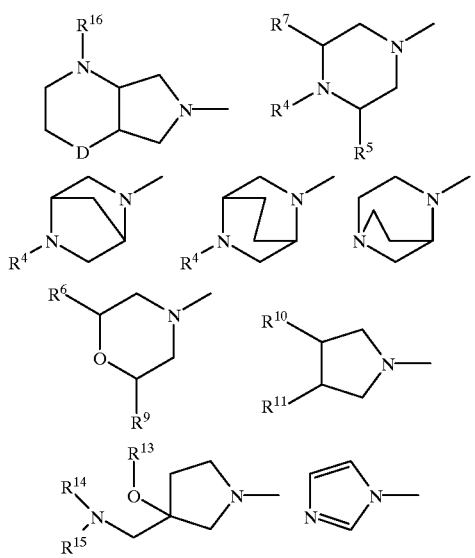

wherein $R^{16}$=H or —CH$_3$,

D=O or —CH$_2$—, $R^4$ represents hydrogen, optionally hydroxyl-substituted straight-chain or branched $C_1$–$C_3$-alkyl or oxyalkyl having 1 to 4 C atoms, $R^5$ represents hydrogen, methyl or phenyl, $R^6$ represents hydrogen or methyl, $R^7$ represents hydrogen or methyl, $R^9$ represents hydrogen, methyl or —CH$_2$—NH$_2$, $R^{10}$ represents hydrogen, methyl, amino, methylamino, dimethylamino, aminomethyl, methylaminomethyl or ethylaminomethyl, $R^{11}$ represents hydrogen, hydroxyl, methyl, fluorine, methyl or hydroxymethyl, $R^{13}$ represents hydrogen or methyl, $R^{14}$ represents hydrogen or methyl, $R^{15}$ represents hydrogen or methyl, and their pharmaceutically usable hydrates and acid addition salts as well as their alkali metal, alkaline earth metal, silver and guanidinium salts.

Particularly preferred compounds of the formula (I) are those in which $R^1$ represents an alkyl radical having 1 to 3 carbon atoms, cyclopropyl, 2-fluoroethyl, methoxy, 2,4-difluorophenyl or methylamino, $R^2$ represents hydrogen or optionally methoxy- or 2-methoxyethoxy- substituted alkyl having 1 to 6 carbon atoms, as well as cyclohexyl, benzyl, 2-oxopropyl, phenacyl, ethoxycarbonylmethyl or pivaloyloxymethyl, A represents nitrogen or =CH—, =C(halogen)—, =C(CH$_3$)—, =C(OCH$_3$)— or =C(CN)—, $X^1$ and $X^2$ independently of one another represent hydrogen, fluorine or NH$_2$, Y represents radicals of the structures

[Chemical structures showing various nitrogen-containing heterocyclic radicals with substituents R⁴, R⁵, R⁶, R⁷, R⁹, R¹⁰, R¹¹, R¹³, R¹⁴, R¹⁵, R¹⁶, and D]

wherein
$R^{16}$=H or —CH$_3$,
D=O or —CH$_2$—,
$R^4$ represents hydrogen, optionally hydroxyl-substituted straight-chain or branched $C_1$–$C_3$-alkyl or hydroxyalkyl having 1 to 4 C atoms,
$R^5$ represents hydrogen, methyl or phenyl,
$R^6$ represents hydrogen or methyl,
$R^7$ represents hydrogen or methyl,
$R^9$ represents hydrogen, methyl or —CH$_2$NH$_2$,
$R^{10}$ represents hydrogen, methyl, amino, methylamino, dimethylamino, aminomethyl, methylaminomethyl or ethylaminomethyl,
$R^{11}$ represents hydrogen, hydroxyl, methyl, fluorine, methyl or hydroxymethyl,
$R^{13}$ represents hydrogen or methyl,
$R^{14}$ represents hydrogen or methyl,
$R^{15}$ represents hydrogen or methyl,
and their pharmaceutically usable hydrates and acid addition salts as well as their alkali metal, alkaline earth metal, silver and guanidinium salts.

Active compounds which may be mentioned as especially preferred are those with the common names enrofloxacin, ciprofloxacin, danofloxacin, ofloxacin, norfloxacin, benofloxacin, sarafloxacin, difloxacin, orbifloxacin, marbofloxacin and oxolinic acid.

Active compounds which may be mentioned in particular are enrofloxacin, ciprofloxacin, marbofloxacin, ofloxacin, norfloxacin and oxolinic acid.

The process according to the invention is preferably carried out in liquid, solid or semi-solid homogeneous or heterogeneous media.

In addition to the active compound to be degraded and the wood rot fungus, these comprise lignin-, lignocellulose- and/or cellulose-containing material. This includes straw, chaff, wood, wood chips, sawdust and ground cereal residue.

The processes can be described as follows:
1. Process for the degradation of quinolone dissolved in water
The preculture of one of the wood rot fungi listed which has been cultured in malt broth which comprises malt extract or an equivalent source of carbon and energy in a concentration of 1–50 g/l, preferably 5–30 g/l, in particular 5–8 g/l,
at 5–40° C., preferably 15–30° C., in particular at 18–22° C.,
while standing or being shaken, preferably shaken at 80–120 rpm,
for a period of 3–28 days, preferably 5–14 days, in particular 5–7 days,
in the dark, in daylight or in all intermediate stages of illumination,
is added to a rinsing water, for example from the preparation process for a quinolone-containing medicament, having a content of 0.01 to 500 ppm, preferably 0.1 to 50 ppm, in particular 1 to 20 ppm, of the quinolone in a ratio of 0.01 to 100 g of dry weight DW/l, preferably 0.1 to 10 g of DW/l, in particular 1 to 3 g of DW/l.

The pH of the suspension can be 3 to 8, preferably 4 to 7, in particular 5 to 6; phosphate is not added. Organic acids, such as, for example, acetic acid or oxalic acid, can be used to adjust the pH.

The content of iron$^{2+}$ or iron$^{3+}$ should be 0.1 to 100 $\mu$M ($10^{-6}$ mol per liter), preferably 1 to 30 $\mu$M, in particular 2 to 20 $\mu$M, the content of NH$_4^+$ can be 0.001 to 20 mM ($10^{-3}$ mol per liter), preferably 0.1 to 10 mM, in particular between 0.1 and 1 mM.

The content of divalent cations should be between 0.1 and 10 mM, preferably 1 mM (for example 0.2 mM CaCl$_2$+0.8 mM MgSO$_4$).

This suspension is incubated under the same conditions as the preculture.

The addition of coniferyl or veratryl alcohol in a concentration of 0.01 to 10 mM, preferably 0.1 to 3 mM, in particular 0.5 to 1 mM, results in an increase in the degrading activity for the quinolone.

2. Process for degrading quinolone bounded to straw, manure or soil

Starting from stock cultures of wood rot fungi on Petri dishes with malt agar, lignocellulose-containing substances, in particular straw, sawdust or wood chips, are inoculated with agar blocks punched out of the stock culture, 0.1 to 100 g of agar per kg of solid substrate, preferably 1 to 10 g of agar per kg of substrate, being employed.

Before the inoculation, water is added to the solid matrix (straw, manure, soil, sludge) comprising the quinolone (0.1 to 200 ppm) until a water content of 10 to 90%, preferably 40 to 50% (based on the weight), is reached.

During the inoculation, the inoculum is distributed in the solid matrix. The subsequent incubation is carried out at 5 to 40° C., preferably 15 to 30° C., in particular at 18 to 22° C.

The following examples illustrate the processes according to the invention:

EXAMPLES

Example 1

One liter of rinsing water from a formulating tank having a content of 10 ppm of enrofloxacin is inoculated with a preculture of *Gloeophyllum striatum* DSM 9592 or *Gloeophyllum striatum* DSM 10335, during which the fungus mycelium is to be transferred from the preculture in ¼ concentrated malt broth into the rinsing water such that a concentration of 2 g of dry weight per liter is achieved. This suspension is incubated at room temperature while shaking at 100 rpm in the dark. After 2 weeks, 10 to 20% of the [carbonyl-$^{14}$C]-enrofloxacin employed was degraded to $^{14}$CO$_2$.

Example 2

1 kg of wheat straw which comprises 2 mg of enrofloxacin bonded adsorptively was moistened with 1 kg of water and inoculated with *Gloeophyllum striatum* DSM 9594. The inoculum comprises 20 agar blocks each weighing about 0.5 g. These small blocks were punched out of a preculture from the fungal colony on malt agar in a Petri dish. The batch was incubated at room temperature in the dark while gassing with moistened air. After 8 weeks, 50% of the enrofloxacin was degraded.

Example 3

0.5 kg of moistened wood chips were inoculated with *Phanerochaeta chrysosporium* DSM 9620 and preincubated for 1 week at room temperature. 0.5 kg of manure from an animal population which had been treated with enrofloxacin was added to this batch. The enrofloxacin content in the manure was 2 ppm. The batch was incubated at room temperature.

Example 4

0.1 kg of wheat straw was moistened with 100 ml of water and inoculated with *Gloeophyllum striatum* DSM 9594. After preincubation for 7 days at room temperature, the straw was covered with a layer of 0.6 kg of field soil (with a water content of about 50%) comprising 10 ppm of enrofloxacin and was incubated at room temperature. After 15 weeks, 6% of the enrofloxacin employed was degraded.

What is claimed is:

1. Process for the treatment or degradation of antimicrobially acting quinolone- and naphthyridonecarboxylic compounds comprising treating the compounds with wood rot fungi to degrade the compounds, optionally in the presence of water and/or inert solid or liquid substrate and auxiliaries.

2. Process according to claim 1, characterized in that the compounds are enrofloxacin or ciprofloxacin.

3. Process of claim 1, characterized in that the wood rot fungi are white rot fungi.

4. Process of claim 1, characterized in that the wood rot fungi are brown rot fungi.

5. Process of claim 1, characterized in that the wood rot fungi are wood-degrading Ascomycetes.

6. Process for the treatment of wastewaters and manure from intensive animal husbandry comprising treating the wastewaters and manure containing antibacterially acting quinolone- and naphthyridonecarboxylic compounds with wood rot fungi to degrade the compounds.

7. Process for the treatment of soils comprising treating the soils containing antibacterially acting quinolone- and naphthyridonecarboxylic compounds with wood rot fungi to degrade the compound.

* * * * *